United States Patent
Shibagaki et al.

(10) Patent No.: US 7,148,584 B2
(45) Date of Patent: Dec. 12, 2006

(54) LOCK CONTROL APPARATUS FOR USE IN VEHICLE

(75) Inventors: Toshimasa Shibagaki, Aichi (JP); Akihito Kimura, Aichi (JP); Yutaka Yoshida, Aichi (JP); Noriyasu Onishi, Aichi-ken (JP); Teruya Tomiyasu, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 455 days.

(21) Appl. No.: 10/649,019

(22) Filed: Aug. 27, 2003

(65) Prior Publication Data

US 2004/0046451 A1    Mar. 11, 2004

(30) Foreign Application Priority Data

Aug. 29, 2002  (JP) ............................... 2002-251651

(51) Int. Cl.
*B60L 3/00*   (2006.01)
*B60R 25/06*  (2006.01)
(52) U.S. Cl. .................................. 307/10.2; 307/10.1
(58) Field of Classification Search ............... 307/10.2, 307/10.1
See application file for complete search history.

(56) References Cited

U.S. PATENT DOCUMENTS

| | | | | |
|---|---|---|---|---|
| 6,552,649 | B1 * | 4/2003 | Okada et al. | 340/5.61 |
| 6,630,889 | B1 * | 10/2003 | Morikawa | 340/825.72 |
| 6,707,375 | B1 * | 3/2004 | Masudaya | 340/5.61 |
| 6,778,065 | B1 * | 8/2004 | Asakura et al. | 340/5.61 |

FOREIGN PATENT DOCUMENTS

EP        0 965 710 A2 *  12/1999  ................ 340/5.61

* cited by examiner

*Primary Examiner*—Lynn Feild
*Assistant Examiner*—Michael Rutland-Wallis
(74) *Attorney, Agent, or Firm*—Crompton, Seager & Tufte, LLC

(57) ABSTRACT

A vehicle lock controller that is easily used. The controller is installed in a vehicle having a plurality of doors and controls locking of the doors through communication with a portable device. The controller includes transmitting circuits, each provided in association with a corresponding one of the doors to output a request signal and request the portable device to transmit a response signal. A control unit is connected to the transmitting circuits to intermittently output the request signal from each of the transmitting circuits at a predetermined cycle. The control unit determines a priority order of the transmitting circuits to set the predetermined cycle of the request signal output from each transmitting circuit in accordance with the priority order.

12 Claims, 6 Drawing Sheets

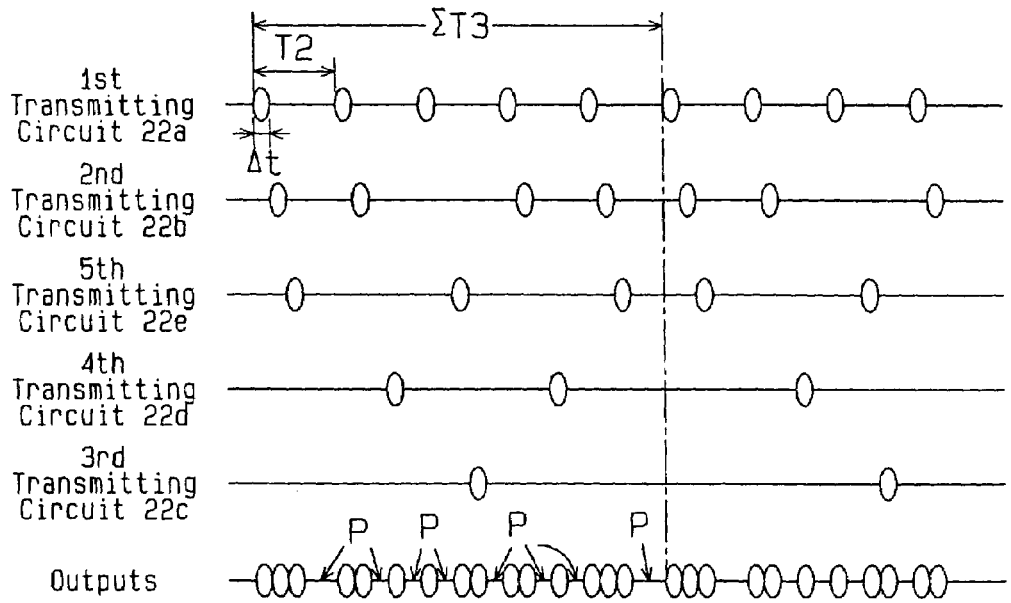
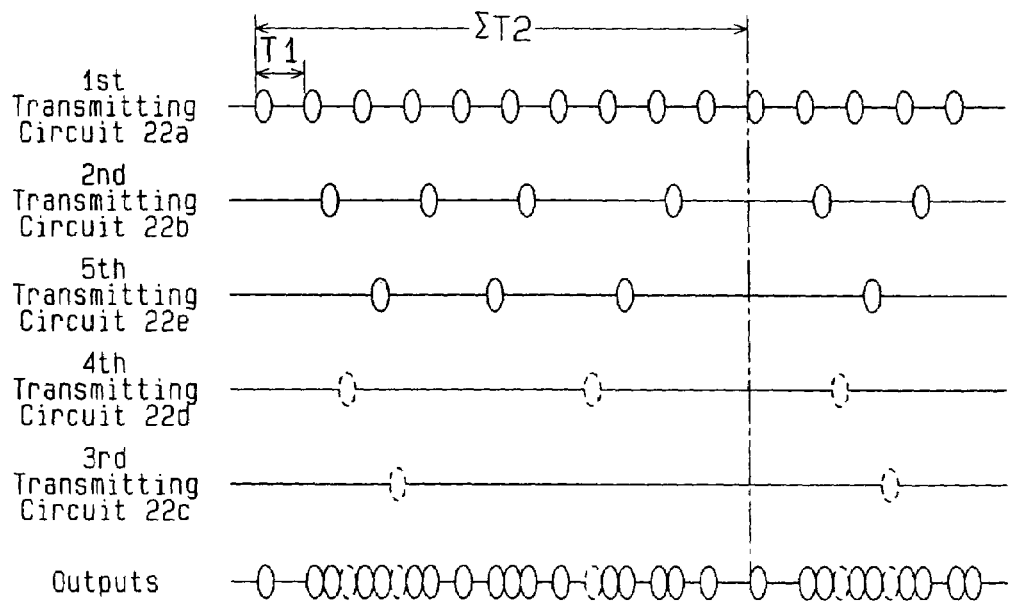

LOCK CONTROL APPARATUS FOR USE IN VEHICLE

BACKGROUND OF THE INVENTION

The present invention relates to a lock control apparatus for use in a vehicle, and more particularly, to an apparatus for locking and unlocking a door of a vehicle without using a mechanical key.

In addition to improvement in basic performance and security, automobiles are nowadays required to be operated with more ease. To achieve such an object, a vehicle lock control system provided with a smart entry function has been proposed. The smart entry function automatically unlocks a door of a vehicle when the owner (driver) of the vehicle approaches the vehicle and locks the door when the driver moves away from the vehicle.

For example, as shown in FIG. 1, a vehicle lock control system 51 of the prior art includes a portable device 52 and a lock controller 53, which is installed in the vehicle 50. The lock controller 53 includes a control unit 54, which is arranged in the passenger compartment, and first to fifth to transmitting circuits 56a to 56e, each of which is arranged on one of a plurality of (five) doors 55a to 55e of the vehicle 50.

The control unit 54 intermittently transmits a request signal having a predetermined frequency from the transmitting circuits 56a to 56e in respective areas A1 to A5. When the portable device 52 enters any one of the first to fifth areas A1 to A5 and receives the request signal, the portable device 52 transmits a radio wave signal (ID code signal) including an ID code in response to the request signal. When the control unit 54 receives the radio wave signal, the lock controller 53 compares the ID code included in the wireless signal with a stored ID code and unlocks the door when the two ID codes match. When the portable device 52 is separated from the first to fifth areas A1 to A5 and the radio wave signal cannot be received, the lock controller 53 locks the door. Thus, the driver does not have to perform any operations to lock or unlock the door. This makes it easier to operate the vehicle.

Referring to FIG. 2, in the prior art, the first to fifth transmitting circuits 56a to 56e sequentially output the request signal so that only one request signal is output at any given time. In other words, the request signal is output from only one of the transmitting circuits 56a to 56e at any given time. Thus, the control unit 54 may confirm which one of the transmitting circuits 56a to 56e generated the request signal to which the ID code signal was transmitted in response and acknowledge the door that the portable device 52 is located near. This unlocks only the door 55a to 55e that is near the portable device 52.

However, in the vehicle lock control system 51 of the prior art, the first to fifth transmitting circuits 56a to 56e sequentially output the request signal. Thus, when the time for a single output of the request signal is represented by Δt, the cycle time T in which the request signal is output from all of the transmitting circuits 56a to 56e is represented by 5×Δt. For example, when the output time Δt is 0.3 seconds, the cycle time T is about 1.5 seconds. Thus, for example, if the driver enters the request signal output area A1 of the first transmitting circuit 56a immediately after the first transmitting circuit 56a outputs the request signal, the driver must wait 1.5 seconds before the door is unlocked. Accordingly, in the vehicle lock control system 51 of the prior art, the communication response between the portable device 52 and the lock controller 53 is not satisfactory. Thus, the door may not be unlocked immediately even if the driver tries to open the door.

SUMMARY OF THE INVENTION

One aspect of the present invention is a vehicle lock controller installed in a vehicle having a plurality of doors to control locking of the doors through communication with a portable device. The vehicle lock controller includes a plurality of transmitting circuits, each provided in association with a corresponding one of the doors to output a request signal and request the portable device to transmit a response signal. A control unit is connected to the transmitting circuits to intermittently output the request signal from each of the transmitting circuits at a predetermined cycle. When receiving the response signal from the portable device, the control unit unlocks the door corresponding to the transmitting circuit that outputs the request signal to which the response signal is transmitted in response. The control unit determines a priority order of the transmitting circuits to set the predetermined cycle of the request signal output from each transmitting circuit in accordance with the priority order.

Another aspect of the present invention is a vehicle lock controller installed in a vehicle having a plurality of doors to control locking of the doors through communication with a portable device. The vehicle lock controller includes a plurality of transmitting circuits, each provided in association with a corresponding one of the doors to output a request signal and request the portable device to transmit a response signal. A control unit is connected to the transmitting circuits to intermittently output the request signal from each of the transmitting circuits at a predetermined cycle. When receiving the response signal from the portable device, the control unit unlocks the door corresponding to the transmitting circuit that outputs the request signal to which the response signal is transmitted in response. The control unit detects how often each door is used and stops the output of the request signal from transmitting circuits that are seldom used when a voltage value of a battery installed in the vehicle becomes lower than a predetermined threshold value.

A further aspect of the present invention is a method for controlling locking of a plurality of doors for a vehicle through communication with a portable device. The vehicle includes a plurality of transmitting circuits, each provided in association with a corresponding one of the doors to output a request signal and request the portable device to transmit a response signal. The method includes intermittently outputting the request signal from each of the transmitting circuits at a predetermined cycle, and when receiving the response signal from the portable device, unlocking the door corresponding to the transmitting circuit that output the request signal to which the response signal is transmitted in response. The method also includes setting the priority order of the transmitting circuits and setting the cycle of the request signal output from each transmitting circuit in accordance with the priority order.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5 to 8 are time charts illustrating the transmission timing of a request signal in the vehicle lock control system of FIG. 3.

DETAILED DESCRIPTION OF THE PREFERRED EMBODIMENTS

Figure 1:
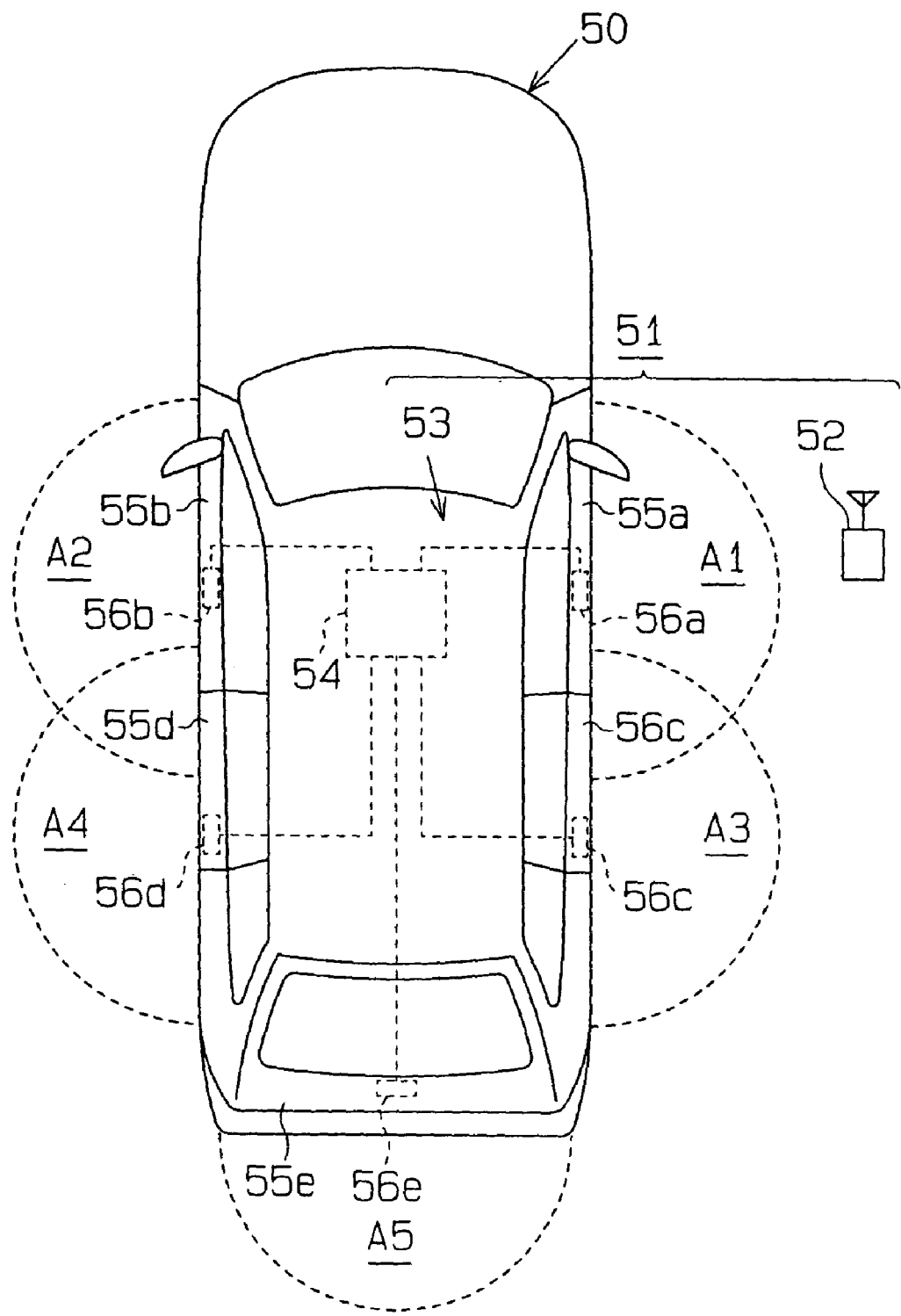
FIG. 1 is a plan view showing a vehicle provided with a prior art vehicle lock control system.

In the drawings, like numerals are used for like elements throughout.

Figure 3:
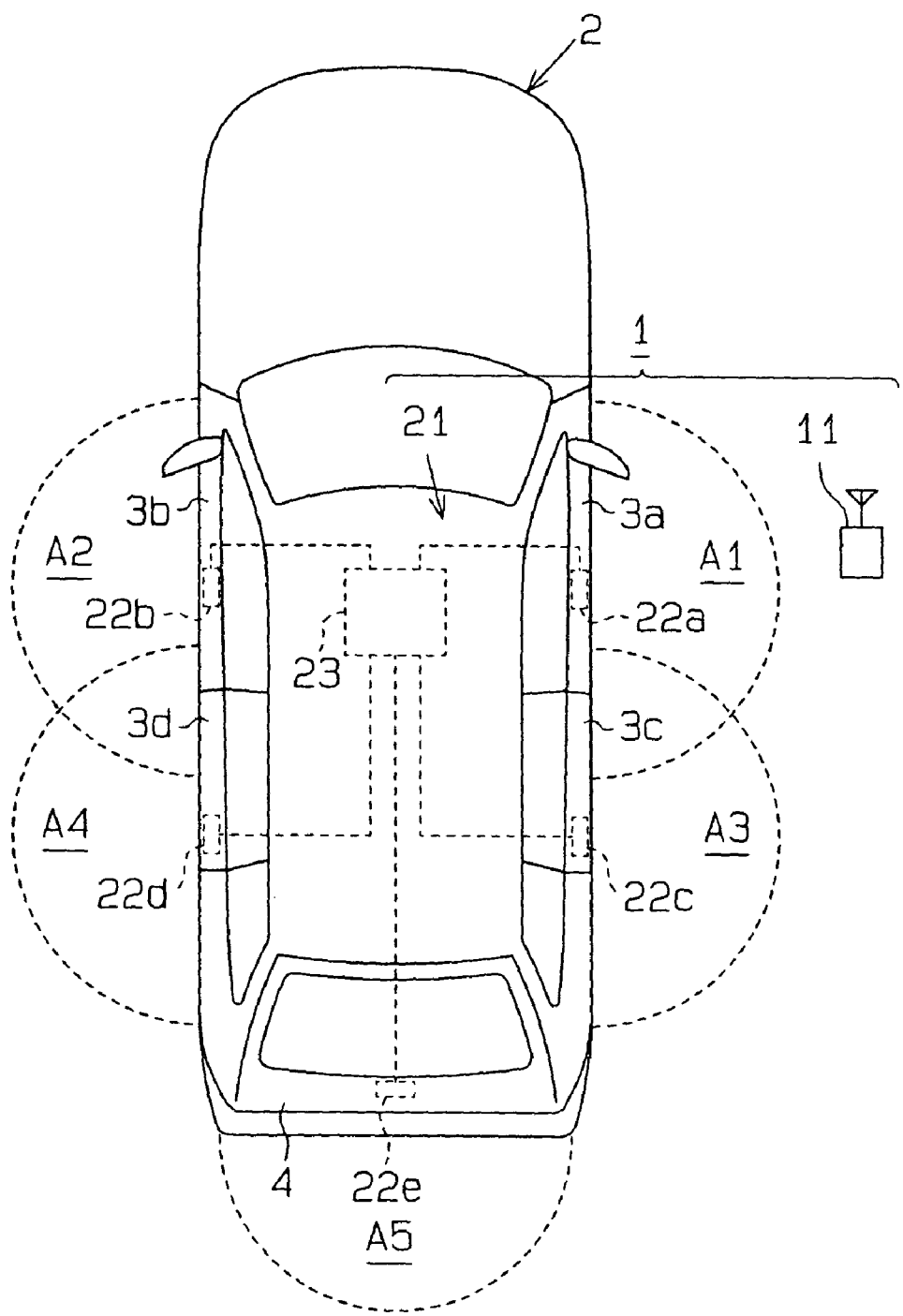
FIG. 3 is a schematic plan view showing a vehicle provided with a vehicle lock control system according to a preferred embodiment of the present invention.

FIG. 3 is a schematic plan view of a vehicle 2 provided with a vehicle lock control system 1 according to a preferred embodiment of the present invention. The vehicle lock control system 1 includes a portable device 11, which is carried by an owner (driver) of the vehicle 2, and a lock controller 21, which is installed in the vehicle 2.

Figure 4:
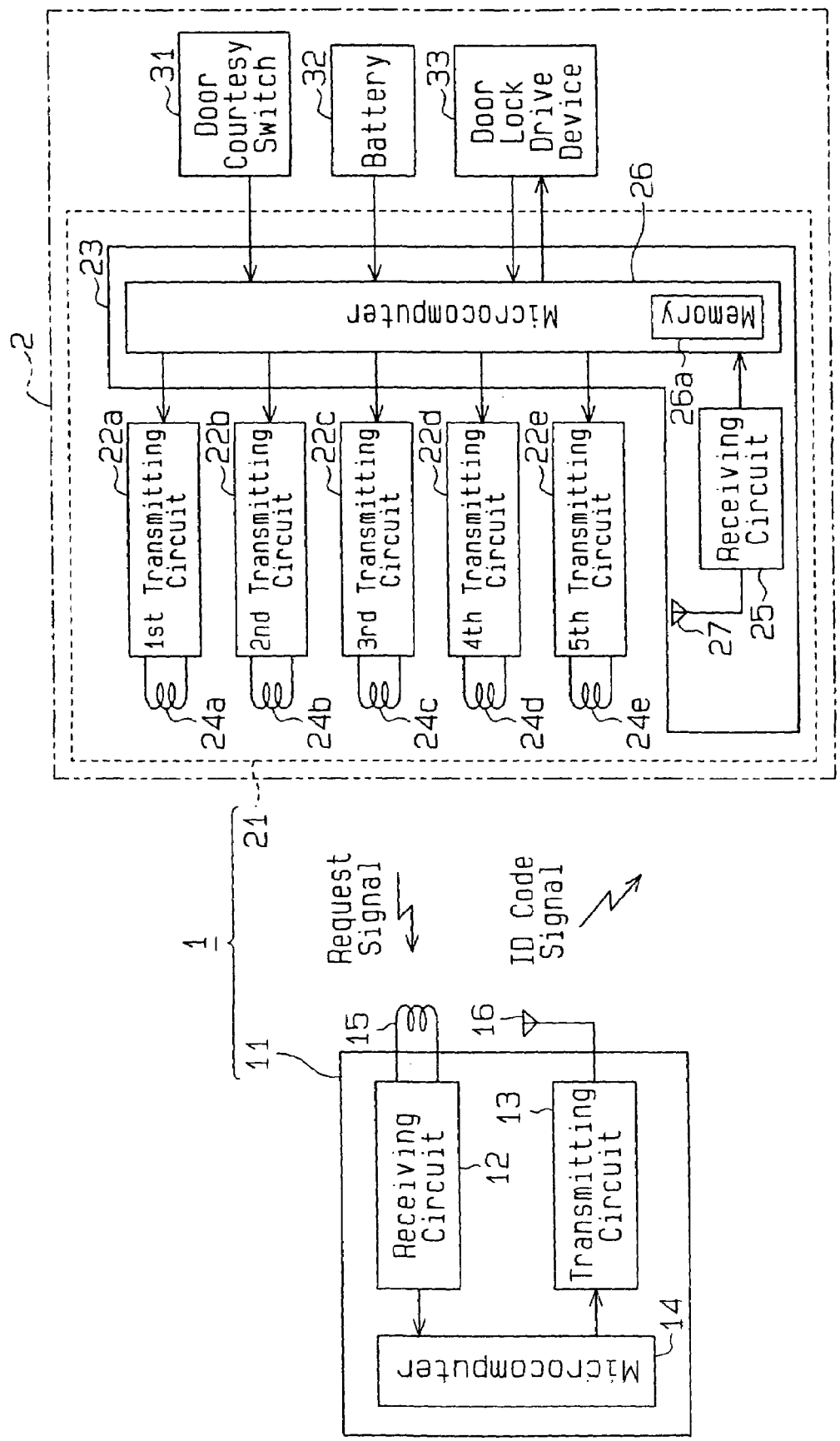
FIG. 4 is a schematic block diagram of the vehicle lock control system of FIG. 3.

As shown in FIG. 4, the portable device 11 includes a receiving circuit 12, a transmitting circuit 13, and a microcomputer 14. The receiving circuit 12 is connected to the microcomputer 14. The lock controller 21 transmits a request signal to the receiving circuit 12. When receiving the request signal, the receiving circuit 12 demodulates the request signal to a pulse signal and provides the pulse signal to the microcomputer 14.

The transmitting circuit 13 is connected to the microcomputer 14 and transmits an ID code signal, which is provided from the microcomputer 14. More specifically, the transmitting circuit 13 modulates the ID code signal to a radio wave having a predetermined frequency (in the preferred embodiment, 314 MHz) and transmits the modulated radio wave. The receiving circuit 12 is connected to a receiving antenna 15, and the transmitting circuit 13 is connected to a transmitting antenna 16. The receiving circuit 12 receives the request signal via the receiving antenna 15, and the transmitting circuit 13 transmits the ID code signal via the transmitting antenna 16.

The microcomputer 14 is a central processing unit (CPU) including a ROM and a RAM (none of which are shown). When receiving the request signal from the receiving circuit 12, the microcomputer 14 generates a transmission signal (ID code signal), which includes a predetermined ID code, and provides the ID code signal to the transmitting circuit 13.

The lock controller 21 includes first to fifth transmitting circuits 22a to 22e and a control unit 23.

As shown in FIG. 3, the first transmitting circuit 22a is located in a right front (driver's) door 3a, and the second transmitting circuit 22b is located in a front left door 3b. The third transmitting circuit 22c is located in a rear right door 3c, and the fourth transmitting circuit 22d is located in a rear left door 3d. The fifth transmitting circuit 22e is located in a hatch (back door) 4.

As shown in FIG. 4, the first to fifth transmitting circuits 22a to 22e are respectively connected to transmitting antennas 24a to 24e. The transmitting circuits 22a to 22e convert the request signal provided from the control unit 23 (more specifically, a microcomputer 26) to a radio wave or a magnetic signal and transmit the converted signal from the respective antennas 24a to 24e to predetermined areas around the vehicle 2.

Referring to FIG. 3, the first transmitting circuit 22a transmits the request signal to area A1, which is defined near the driver's door 3a, and the second transmitting circuit 22b transmits the request signal to area A2, which is defined near the front left door 3b. The third transmitting circuit 22c transmits the request signal to area A3, which is defined near the rear right door 3c, and the fourth transmitting circuit 22d transmits the request signal to area A4, which is defined near the rear left door 3d. The fifth transmitting circuit 22e transmits the request signal to area A5, which is defined near the back door 4. Accordingly, mutual communication between the portable device 11 and the lock controller 21 is enabled in the areas A1 to A5, in which the request signal is transmitted. In the referred embodiment, the request signal is transmitted as a radio wave at 134 kHz.

The control unit 23 is located near the middle of the vehicle 2 and connected to the transmitting circuits 22a to 22e. As shown in FIG. 4, the control unit 23 includes a receiving circuit 25 and the microcomputer 26.

The receiving circuit 25 receives the ID code signal transmitted from the portable device 11 via an antenna 27, demodulates the ID code signal to a pulse signal, and generates an input signal. The input signal is provided to the microcomputer 26.

The microcomputer 26 is a CPU, which includes a ROM and a RAM (none of which are shown), and has a non-volatile memory 26a. The memory 26a stores a predetermined ID code (hereinafter referred to as reference ID code). The microcomputer 26 provides the first to fifth transmitting circuits 22a to 22e with the request signal in different cycles, generates only one request signal at any given time, and provides the request signal to only one of the transmitting circuits 22a to 22e at any given time.

When receiving the request signal, the transmitting circuits 22a to 22e convert the request signal to a radio wave and transmits the converted radio wave to the areas A1 to A5 via the transmitting antennas 24a to 24e, respectively. Thus, the transmitting circuits 22a to 22e intermittently transmits the request signals to the corresponding areas A1 to A5.

The microcomputer 26 is connected to door courtesy switches 31, a battery 32 and a door lock drive device 33. The door courtesy switches 31 are each arranged in one of the doors 3a to 3d and 4 and used to detect whether the associated door 3a to 3d and 4 is opened. The battery 32 is a conventional battery installed in the vehicle 2. The door lock drive device 33 includes an actuator for driving the door locks and controls the actuator with an electric signal.

The ID code signal is transmitted from the portable device 11 in response to the request signal from one of the transmitting circuits 22a to 22e. When receiving the input signal (ID code signal) from the receiving circuit 25, based on the input timing, the microcomputer 26 determines the transmitting circuit 22a to 22e that transmitted the request signal to which the ID code signal was transmitted in response. The microcomputer 26 compares the ID code included in the ID code signal with a reference ID code to perform ID code verification. When the two ID codes match, the microcomputer 26 provides the door lock drive device 33 with a drive signal so that the door 3a to 3d or 4 corresponding to the transmitting circuit 22a to 22e that transmitted the request signal to which the ID code signal was transmitted in response is unlocked. When the receiving circuit 25 does not receive the ID code signal or the two ID codes do not match, the microcomputer 26 provides the door lock drive device 33 with a drive signal so that the doors 3a to 3d and 4 are locked or remain locked.

The memory 26a of the microcomputer 26 stores parameters that determine the output pattern of the request signal sent to the first to fifth transmitting circuits 22a to 22e. In the preferred embodiment, the memory 26a stores parameters so that in the initial setting, the output cycle of the request signal becomes longer in the order of the first transmitting circuit 22a, the second transmitting circuit 22b, the fifth transmitting circuit 22e, the fourth transmitting circuit 22d, and the third transmitting circuit 22c. Thus, the microcomputer 26 provides the first transmitting circuit 22a with the request signal having the shortest cycle and the third transmitting circuit 22c with the request signal having the longest cycle.

The microcomputer 26 determines a priority order of the first to fifth transmitting circuits 22a to 22e. The first transmitting circuit 22a is given the highest priority, and the third transmitting circuit 22c is given the lowest priority.

Figure 5:
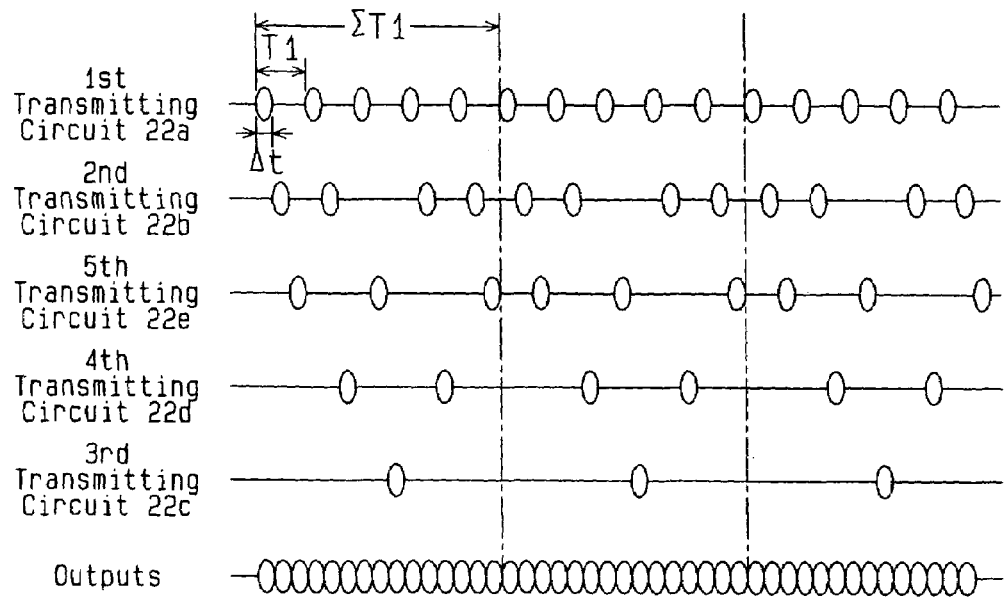

More specifically, referring to FIG. 5, the cycle time of the request signal output from the first transmitting circuit 22a is represented by T1. The cycle time T1 is three times greater than the output time $\Delta t$ of the request signal ($3 \times \Delta t$). For example, if the output time at is 0.3 seconds, the cycle time T1 is about 0.9 seconds.

Therefore, the cycle time T1 is shorter than the cycle time T in the prior art by 0.6 seconds. During period $\Sigma T1$ ($5 \times T1$) in which the microcomputer 26 provides the first transmitting circuit 22a with the request signal five times, the microcomputer 26 provides the second transmitting circuit 22b with the request signal four times. During the same period $\Sigma T1$, the microcomputer 26 provides the request signal to the fifth transmitting circuit 22e three times, the fourth transmitting circuit 22d twice, and the third transmitting circuit 22c once at predetermined timings. The microcomputer 26 constantly provides one of the first to fifth transmitting circuits 22a to 22e with the request signal.

In the preferred embodiment, the cycle time T1 of the request signal provided to the first transmitting circuit 22a is three times greater than the output time $\Delta t$ of the request signal. During the output cycle T1, when the request signal is not provided to the first transmitting circuit 22a, the request signal is provided to two of the second to fifth transmitting circuits 22b to 22e. As shown in FIG. 5, the request signals are repeatedly provided to the transmitting circuits 22a to 22e in a cycle during period $\Sigma T1$.

In the vehicle lock control system 1, when the owner (driver) of the portable device 11 approaches the driver's door 3a, mutual communication is performed between the portable device 11 and the lock controller 21 most frequently. When the driver approaches the rear right door 3c, mutual communication is performed between the portable device 11 and the lock controller 21 least frequently. Since the driver uses the driver's door 3a most frequently, the convenience for locking and unlocking the door is improved.

The microcomputer 26 of the lock controller 21 obtains the usage frequency of each of the doors 3a to 3d and 4 based on the communication with the portable device 11 and the activation of the corresponding door courtesy switches 31. More specifically, when detecting the opening of the doors 3a to 3d and 4 from the activation of the courtesy switches 31, the microcomputer 26 determines which one of the areas A1 to A5 the portable device 11 is located in. The microcomputer 26 counts the number of times each of the doors 3a to 3d or 4 is opened when the portable device 11 is located in the respective areas A1 to A5 and stores the counted numbers in the memory 26a.

For example, when the portable device 11 is located in area A1, which is near the driver's door 3a, and the driver's door 3a is opened, the microcomputer 26 determines that the driver's door 3a has been used and counts the opening of the driver's door 3a. When the front left door 3b is opened but the portable device is located in area A1, the microcomputer 26 does not count the opening of the front left door 3b.

The microcomputer obtains the usage frequency of each of the doors 3a to 3d and the back door 4 based on the usage number recorded in the memory 26a. For example, in the past ten usages, if the driver's door 3a has been used four times, the front left door 3b has been used three times, the back door 4 has been used twice, the rear left door 3d has been used once, and the rear right door 3c has never been used, the microcomputer 26 determines that the driver's door 3a is most frequently used and the rear right door 3c is least frequently used.

The microcomputer 26 changes the initially set output pattern of the request signal based on the usage frequency. More specifically, based on the usage frequency of the doors 3a to 3d and 4, the microcomputer 26 determines the priority order from the transmitting circuit corresponding to the most frequently used door (in this case, the first transmitting circuit 22a) to the transmitting circuit corresponding to the least frequently used door (in this case, the third transmitting circuit 22c). The microcomputer 26 provides transmitting circuits having a higher priority with a request signal having a shorter cycle and transmitting circuits having a lower priority with a request signal having a longer cycle.

Therefore, if, for example, the back door 4 is used most frequently and the usage frequency decreases in the order of the driver's door 3a, the rear right door 3c, the rear left door 3d, and the front left door 3b, the microcomputer 26 sets the request signal of the fifth transmitting circuit 22e to have the shortest output cycle. Then, the microcomputer 26 increases the output cycle of the request signal for the remaining transmitting circuits in the order of the first transmitting circuit 22a, the third transmitting circuit 22c, the fourth transmitting circuit 22d, and the second transmitting circuit 22b. In other words, the microcomputer 26 is provided with a learning function for automatically adjusting the output cycle of the request signal for the first to fifth transmitting circuits 22a to 22e in accordance with the history of the usage frequency of the doors 3a to 3d and 4.

The microcomputer 26 calculates the relative usage frequency rate of each of the doors 3a to 3d and 4. More specifically, the microcomputer 26 calculates the usage frequency rate based on the counted usage number of each of the doors 3a to 3d and 4 recorded on the memory 26a. For example, the usage frequency rate in the above example is 40% for the driver's door 3a, 30% for the front left door 3b, 20% for the back door 3a, 10% for the rear left door 3d, and 0% for the rear right door 3c. In this case, the microcomputer 26 provides the first transmitting circuit 22a with the request signal during 40% of the period $\Sigma T1$ and the second transmitting circuit 22b with the request signal during 30% of the period $\Sigma T1$. Further, the microcomputer 26 provides the fifth transmitting circuit 22e with the request signal during 15% of the period $\Sigma T1$, the fourth transmitting circuit 22d with the request signal during 10% of the period $\Sigma T1$ and the third transmitting circuit 22c with the request signal during 5% of the period ΣT1. Thus, as a usage frequency of a certain one of the doors 3a to 3d and the back door 4 increases, the request signal is generated at a high frequency when the person carrying the portable device 11 moves near or away from that door 3a to 3d or 4.

Figure 6:
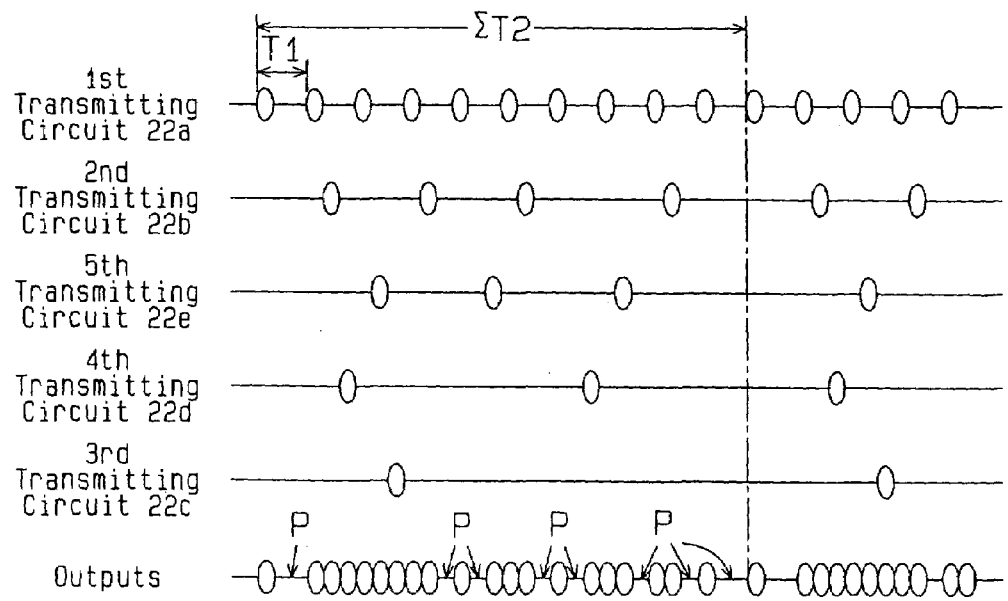

Further, the microcomputer 26 monitors the voltage value of the battery 32 based on a signal provided from the battery 32. Referring to FIG. 6, when the voltage value of the battery 32 becomes less than a predetermined threshold value, the microcomputer 26 reduces the percentage the output time of the request signal occupies during a predetermined period time (period ΣT2 in FIG. 6). More specifically, the microcomputer 26 provides the first transmitting circuit 22a with a request signal during cycle time T1. When the request signal is provided to the first transmitting circuit 22a ten times during period ΣT2 (10×T1), the microcomputer 26 provides the second transmitting circuit 22b with the request signal four times.

Further, during period ΣT2, the microcomputer 26 provides the fifth transmitting circuit 22e with the request signal three times at a predetermined timing, the fourth transmitting circuit 22d with the request signal twice at a predetermined timing, and the second transmitting circuit 22b with the request signal once at a predetermined timing. In other words, the microcomputer 26 decreases the number of times the request signal is provided to the second to fifth transmitting circuits 22b in comparison to when the voltage value of the battery 32 is greater than or equal to the threshold value. Thus, as shown by arrows P in FIG. 6, there are times (blank periods) when the request signal is not output to any one of the transmitting circuits 22a to 22e when the voltage value of the battery 32 becomes less than the threshold value. This reduces the amount of power consumed to generate the request signal.

In the preferred embodiment, when the voltage value of the battery 32 is greater than or equal to the threshold value, the total number the request signal is output during period ΣT2 is set to thirty times. However, when the voltage value of the battery 32 is less than the threshold value, the total number the request signal is output during period ΣT2 is set to twenty times. Thus, in comparison to when the voltage value of the battery 32 is greater than or equal to the threshold value, the power amount consumed when outputting the request signal is reduced by 33%.

The lock controller 21 of the preferred embodiment has the advantages described below.

(1) The output cycle of the request signals output from the first to fifth transmitting circuits 22a to 22e differs in accordance with a priority order that is determined by the initial setting or by the usage frequency of the doors 3a to 3d and 4. The first transmitting circuit 22a, which has high priority, outputs the request signal with a short output cycle. The third transmitting circuit 22c, which has a low priority, outputs the request signal with a long output cycle. Thus, the first transmitting circuit 22a enables immediate mutual communication between the lock controller 21 and the portable device 11. Accordingly, the associated door is readily locked and unlocked. Since the locking and unlocking of the doors is performed with a quick response during normal usage of the vehicle 2, the vehicle lock control system 1 is easy to use.

(2) The output cycles of the request signals output from the first to fifth transmitting circuits 22a to 22e are automatically changed in accordance with the usage frequency of the corresponding doors 3a to 3d and back door 4. The output cycle of the request signal is short for the first transmitting circuit 22a corresponding to the driver's door 3a, which is frequently used. In other words, when a certain one of the doors 3a to 3d and 4 is used frequently, the locking and unlocking response of the certain one of the doors 3a to 3d and 4 becomes quicker when the person carrying the portable device 11 approaches or moves away from the door. Thus, during normal usage of the vehicle 2, the locking and unlocking of the door is performed with a high response. This makes it easier to use the vehicle lock control system 1.

(3) When the voltage value of the battery 32 becomes lower than a predetermined threshold value, the ratio of the total output time of the request signal that occupies a predetermined period (ΣT2) decreases. This reduces the consumed amount of power of the battery 32 for the generation and output of the request signal and suppresses battery drainage.

It should be apparent to those skilled in the art that the present invention may be embodied in many other specific forms without departing from the spirit or scope of the invention. Particularly, it should be understood that the present invention may be embodied in the following forms.

Referring to FIG. 7, when the voltage value of the battery 32 becomes lower than a predetermined threshold value, the output cycle of the request signal for the first transmitting circuit 22a may be adjusted so that it has a cycle time T2, which is longer than cycle time T1. As shown in FIG. 7, the cycle time T2 is five times greater than the output time Δt of the request signal. During a period ΣT3 (5×T2) in which the first transmitting circuit 22a outputs the request signal five times, the microcomputer 26 outputs the request signal four times from the second transmitting circuit 22a. Further, during period ΣT3, the microcomputer 26 outputs the request signal from the fifth transmitting circuit 22e three times, the fourth transmitting circuit 22d twice, and the third transmitting circuit 22c once at predetermined timings. The total number of times the request signal is output is fifteen times. In this case, the maximum number of times the request signal may be output during ΣT3 is twenty-five. This produces blank periods as shown by arrows P in FIG. 7 and reduces the consumed power amount of the battery 32 by 40%.

A second threshold value lower than the first threshold value, which is compared with the voltage value of the battery 32, may further be set. If the voltage value of the battery 32 becomes lower than the second threshold value, the output of the request signal from transmitting circuits having low priority (in this case, the fourth transmitting circuit 22d and the third transmitting circuit 22c) may be stopped. The broken lines of FIG. 8 represent request signals of which output has been stopped. This further reduces the consumed power amount of the battery 32 and further suppresses battery drainage.

Figure 2:
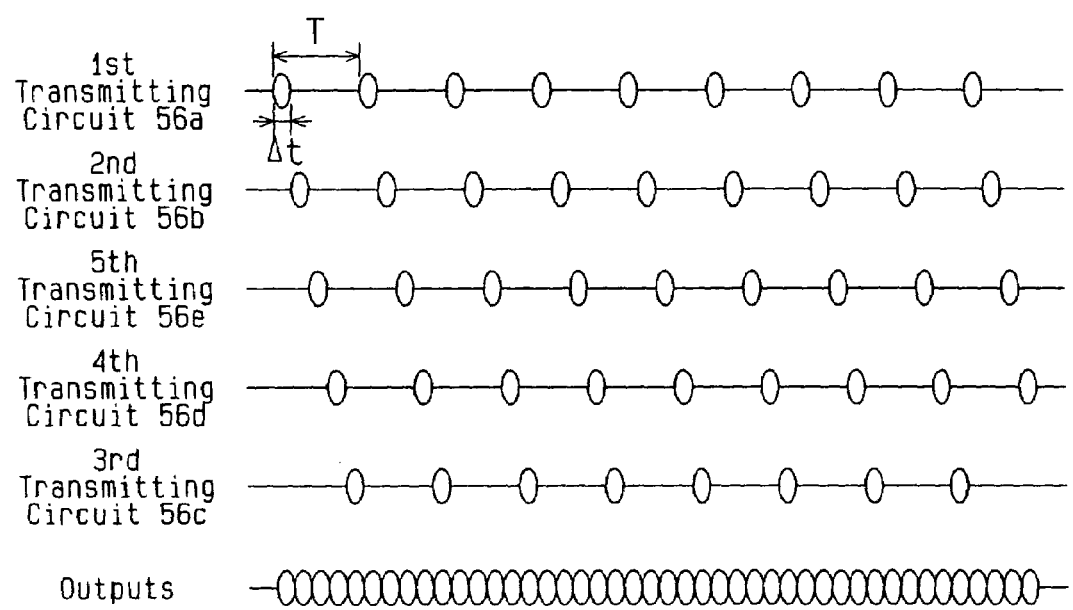
FIG. 2 is a time chart showing the transmission timing of the request signal in the prior art.

The stopping of the request signal output may be applied to the prior art example shown in FIG. 2 and the example shown in FIG. 7. When applied to the prior art example, the request signal is normally output from the first to fifth transmitting circuits 22a to 22e at the timings shown in FIG. 2. When the voltage value of the battery 32 becomes lower than the predetermined threshold value, the output of the request signal from transmitting circuits 22a to 22e having low priority is stopped. In this case, the priority is determined from the usage frequency of the corresponding doors 3a to 3d and 4.

When the stopping of the request signal output is applied to the example of FIG. 5, the request signal is normally output from the first to fifth transmitting circuits 22a to 22e at the timings shown in FIG. 5. When the voltage value of the battery 32 becomes lower than the predetermined threshold value, the output of the request signal from low priority transmitting circuits (in this case, the fourth transmitting circuit 22d and the third transmitting circuit 22c) is stopped.

When the stopping of the request signal output is applied to the example of FIG. 7, the output of the request signal from low priority transmitting circuits (in this case, the fourth transmitting circuit 22d and the third transmitting circuit 22c) is stopped if the voltage value of the battery 32 becomes lower than the second threshold value.

Parameters related with the output cycle of the request signal do not necessarily have to be recorded on the memory 26a. For instance, in the prior art example of FIG. 2, the priority order of the transmitting circuits does not have to be determined in the initial setting of the output cycle and may be set by means of the learning function, which is based on the usage frequency of the doors 3a to 3d and 4.

In the above embodiments, parameters are recorded on the memory 26a of the microcomputer 26 to determine the priority order of the first to fifth transmitting circuits 22a to 22e. However, for example, setting registration switches may be arranged in the passenger compartment of the vehicle 2 to enable the user to set the priority order of the transmitting circuits 22a to 22e.

Instead of decreasing the output number of the request signal, the output intensity of the request signal may be decreased in low priority transmitting circuits. This would also decrease the consumed power amount of the battery 32.

The learning function for automatically adjusting the output cycle of the request signal may be eliminated and the output control of the request signal of the first to fifth transmitting circuits 22a to 22e may be performed based on only the initial setting. This reduces the processing load of the microcomputer 26.

All of the doors 3a to 3d and 4 do not necessarily have to be provided with a transmitting circuit, and the number of the transmitting circuits is not limited.

Each of the transmitting circuits 22a to 22e may be arranged at any location as long as the request signal can be output in the corresponding areas A1 to A5.

The present examples and embodiments are to be considered as illustrative and not restrictive, and the invention is not to be limited to the details given herein, but may be modified within the scope and equivalence of the appended claims.

What is claimed is:

1. A vehicle lock controller installed in a vehicle having a plurality of doors to control locking of the doors through communication with a portable device, the vehicle lock controller comprising:
   a plurality of transmitting circuits, each provided in association with a corresponding one of the doors to output a request signal and request the portable device to transmit a response signal; and
   a control unit connected to the transmitting circuits to intermittently transmit the request signal to each of the transmitting circuits at a predetermined cycle, wherein when receiving the response signal from the portable device, the control unit unlocks the door corresponding to the transmitting circuit that outputs the request signal to which the response signal is transmitted in response, the control unit transmitting the request signal to each transmitting circuit at the predetermined cycle set in accordance with a priority order determined based on how often each door is used, wherein the control unit shortens the predetermined cycle of transmitting the request signal to transmitting circuits corresponding to doors that are often used.

2. The vehicle lock controller according to claim 1, wherein the control unit shortens the predetermined cycle of the request signal in transmitting circuits having a higher priority.

3. The vehicle lock controller according to claim 1, wherein the control unit decreases an output intensity of the request signal in transmitting circuits having a lower priority when a voltage value of a battery installed in the vehicle becomes lower than a predetermined threshold value.

4. The vehicle lock controller according to claim 1, wherein the control unit decreases a total output time of the request signals in a predetermined time when a voltage value of a battery installed in the vehicle becomes lower than a predetermined threshold value.

5. The vehicle lock controller according to claim 4, wherein the control unit stops outputting the request signal from transmitting circuits having a lower priority when the voltage value of the battery becomes lower than the threshold value.

6. A vehicle lock controller installed in a vehicle having a plurality of doors to control locking of the doors through communication with a portable device, the vehicle lock controller comprising:
   a plurality of transmitting circuits, each provided in association with a corresponding one of the doors to output a request signal and request the portable device to transmit a response signal; and
   a control unit connected to the transmitting circuits to intermittently output the request signal from each of the transmitting circuits at a predetermined cycle, wherein when receiving the response signal from the portable device, the control unit unlocks the door corresponding to the transmitting circuit that outputs the request signal to which the response signal is transmitted in response, the control unit detecting how often each door is used and stopping the output of the request signal from transmitting circuits that are seldom used when a voltage value of a battery installed in the vehicle becomes lower than a predetermined threshold value.

7. A method for controlling locking of a plurality of doors for a vehicle through communication with a portable device, the vehicle including a plurality of transmitting circuits, each provided in association with a corresponding one of the doors to output a request signal and request the portable device to transmit a response signal, the method comprising the steps of:
   intermittently transmitting the request signal to each of the transmitting circuits at a predetermined cycle;
   when receiving the response signal from the portable device, unlocking the door corresponding to the transmitting circuit that output the request signal to which the response signal is transmitted in response;
   determining the priority order of the transmitting circuits; and
   setting the cycle of the request signal transmitted to each transmitting circuit in accordance with the priority order;
   wherein the step of setting the priority order includes:
      detecting how often each door is used; and
      determining the priority order of the transmitting circuits based on how often each door is used.

8. The method according to claim 7, wherein the step for setting the cycle of the request signal includes shortening the predetermined cycle of the request signal in transmitting circuits having a higher priority.

9. The method according to claim 7, wherein the step of setting the priority order includes shortening the predetermined cycle of the request signal in transmitting circuits corresponding to doors that are often used.

10. The method according to claim 7, further comprising the step of:
    decreasing an output intensity of the request signal in transmitting circuits having a lower priority when a voltage value of a battery installed in the vehicle becomes lower than a predetermined threshold value.

11. The method according to claim 7, further comprising the step of:
    decreasing a total output time of the request signals in a predetermined time when a voltage value of a battery installed in the vehicle becomes lower than a predetermined threshold value.

12. The method according to claim 11, wherein the step for decreasing a ratio of a total output time includes stopping output of the request signal from transmitting circuits having a lower priority when the voltage value of the battery becomes lower than the threshold value.

* * * * *

UNITED STATES PATENT AND TRADEMARK OFFICE
CERTIFICATE OF CORRECTION

| | |
|---|---|
| PATENT NO. | : 7,148,584 B2 |
| APPLICATION NO. | : 10/649019 |
| DATED | : December 12, 2006 |
| INVENTOR(S) | : Toshimasa Shibagaki et al. |

It is certified that error appears in the above-identified patent and that said Letters Patent is hereby corrected as shown below:

Column 5
Line 29, delete "at" and insert therefor -- $\Delta t$ --.

Signed and Sealed this

Twenty-ninth Day of May, 2007

JON W. DUDAS
*Director of the United States Patent and Trademark Office*